(12) United States Patent
Künnen

(10) Patent No.: US 9,210,915 B2
(45) Date of Patent: Dec. 15, 2015

(54) FISH-SORTING DEVICE AND METHOD

(75) Inventor: Sven Künnen, Vechta (DE)

(73) Assignee: BIG DUTCHMAN INTERNATIONAL GMBH, Vechta (DE)

(*) Notice: Subject to any disclaimer, the term of this patent is extended or adjusted under 35 U.S.C. 154(b) by 258 days.

(21) Appl. No.: 13/822,859

(22) PCT Filed: Sep. 14, 2011

(86) PCT No.: PCT/EP2011/065919
§ 371 (c)(1),
(2), (4) Date: Apr. 22, 2013

(87) PCT Pub. No.: WO2012/035054
PCT Pub. Date: Mar. 22, 2012

(65) Prior Publication Data
US 2013/0248425 A1  Sep. 26, 2013

(30) Foreign Application Priority Data
Sep. 14, 2010  (DE) .................. 20 2010 012 571 U

(51) Int. Cl.
*B07C 5/16* (2006.01)
*A01K 61/00* (2006.01)
(Continued)

(52) U.S. Cl.
CPC .............. *A01K 61/001* (2013.01); *A22C 25/04* (2013.01); *B07C 5/18* (2013.01); *G01G 17/08* (2013.01)

(58) Field of Classification Search
CPC ............. B07C 5/16; B07C 5/18; B07C 5/20; B07C 5/22; B07C 2501/0081; A01K 61/001; A22C 25/04; G01G 17/08
USPC .......................... 209/552, 592, 645; 700/219
See application file for complete search history.

(56) References Cited

U.S. PATENT DOCUMENTS 3,857,488 A  12/1974  Le Cren
4,934,537 A   6/1990  DeBourke
(Continued)

FOREIGN PATENT DOCUMENTS

CH  583503    1/1977
CN  1387400  12/2002
(Continued)

OTHER PUBLICATIONS

PCT/EP2011/065919 International Search Report (in German).
(Continued)

*Primary Examiner* — Joseph C Rodriguez
*Assistant Examiner* — Kalyanavenkateshware Kumar
(74) *Attorney, Agent, or Firm* — Price Heneveld LLP

(57) ABSTRACT

The invention relates to a fish sorting device, comprising a weighing compartment which is designed to receive a single fish, a weighing device which is coupled mechanically to the weighing compartment and is designed to sense the weight exerted on the weighing compartment by the fish. The invention is characterized by at least two discharge ports through which a fish can be removed from the fish sorting device, a sorter which is designed to sort the fish from the weighing compartment selectively into one of the at least two discharge ports, an actuator unit (73,74) which is coupled mechanically to the sorter and actuates a movable sorting element (13,14) of the sorter in order to sort the fish into one of the discharge ports, and a control unit which is in signal communication with the weighing device and the actuator unit and is designed to compare a weight determined by the weighing device with at least one limit weight, and activate the actuator unit, depending on the comparison between the determined weight and the limit weight, in such a way that, when the limit weight is exceeded, the fish is sorted into a first discharge port and, when the weight falls short of the limit weight, the fish is sorted into a second discharge port different from the first.

16 Claims, 4 Drawing Sheets

Figure 1:
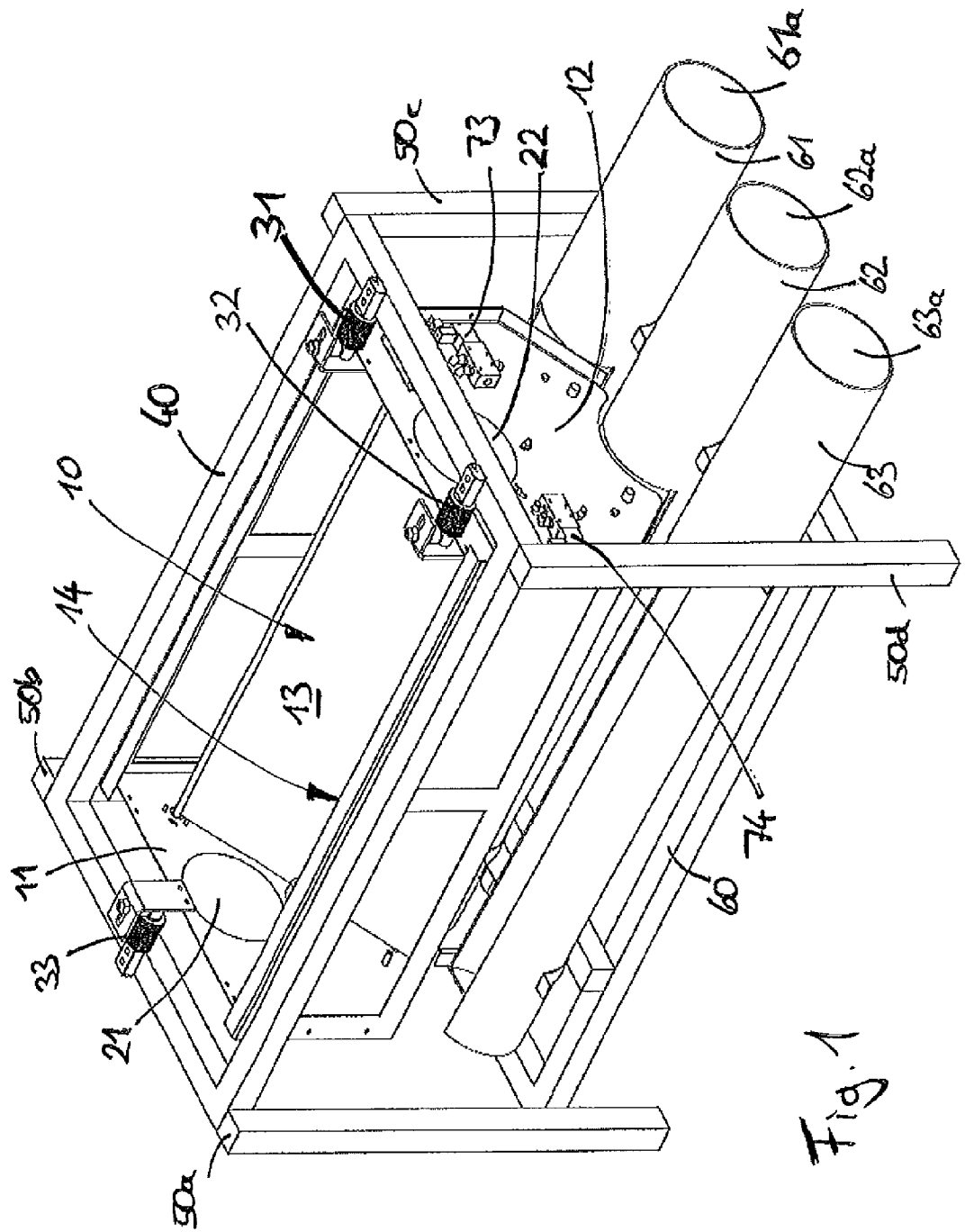

(51) Int. Cl.
*A22C 25/04* (2006.01)
*B07C 5/18* (2006.01)
*G01G 17/08* (2006.01)

(56) References Cited

U.S. PATENT DOCUMENTS

| | | | | |
|---|---|---|---|---|
| 5,813,195 | A * | 9/1998 | Nielsen et al. | 53/443 |
| 6,262,377 | B1 * | 7/2001 | Nielsen et al. | 209/592 |
| 2009/0178861 | A1 | 7/2009 | Hayakawa et al. | |
| 2009/0216368 | A1 * | 8/2009 | Thorsson | 209/592 |

FOREIGN PATENT DOCUMENTS

| | | |
|---|---|---|
| CN | 2829919 | 10/2006 |
| CN | 2871021 | 2/2007 |
| CN | 201108008 | 9/2008 |
| JP | H03072201 | 3/1991 |
| JP | H04179420 | 6/1992 |
| JP | 8050052 | 2/1996 |
| WO | 0176774 | 10/2001 |
| WO | 03059052 | 7/2003 |
| WO | 2008129564 | 10/2008 |
| WO | 2010142413 | 12/2010 |

OTHER PUBLICATIONS

Office Action Summary, Appln. No. 2013-0528651, Big Dutchman International GmbH; translated, undated.
State Intellectual Property Office of People's Republic of China, Appln. No. 201180044314.6, Notification of First Office Action (Nov. 15, 2013) (translated).

* cited by examiner

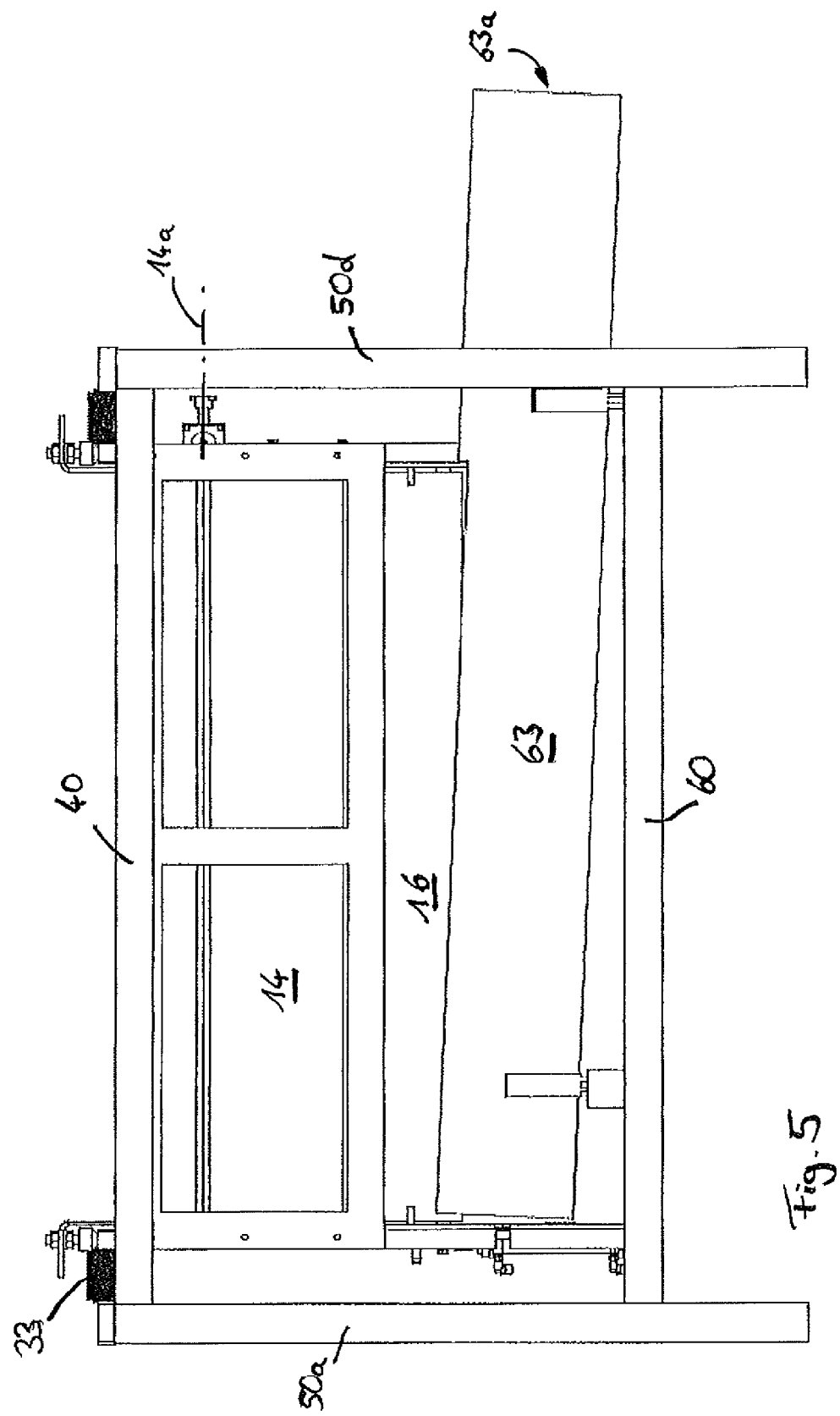

FISH-SORTING DEVICE AND METHOD

The invention relates to a fish sorting device, comprising a weighing compartment which is designed to receive a single fish, a weighing device which is coupled mechanically to the weighing compartment and is designed to sense the weight exerted on the weighing compartment by the fish. Another aspect of the invention concerns a method for sorting fish.

Fish sorting devices of this kind are used, for example, to sort animals caught at sea according to their weight. The deployment, purpose and manner of using these fish sorting devices is based on the considerable variation in the size and weight of the animals caught, despite a minimum size for the animals in a catch as predefined by the mesh size of a fishing net. Sorting is therefore carried out for the purpose of classifying fish into specific categories that subsequently enter the trade and are sold.

Due to the lack of effective regulation for most fish species, the world fish catch has meanwhile led to a decline in stocks that is attributable to constant overfishing. The environmental and economic problems this entails means that fish breeding in aquacultures is becoming increasingly important, as it allows fish, as a food, to be provided on an scale that is environmentally compatible. However, one prerequisite that needs to be met if fish breeding is to be compete with fish supplies from deep-sea fishing is that it can supply fish at a competitive price despite the investment and work involved.

The object of the present invention is to improve the economic efficiency of aquaculture systems for fish farming. Another object of the invention is to provide a fish breeding method which improves the efficiency of fish breeding in aquaculture systems.

That hatchery fish of the same age that have been raised in a shared breeding pond develop differently and therefore show different growth behaviour is basically known. In biological terms, this is because the amount of food uptake by these fish varies within the group on account of dominance. It is advantageous, because of this observation on which the invention is based, that such fish be distributed for breeding among different tanks if such differences in growth are observed.

A major challenge facing fish sorting for this purpose is that living fish must be sorted and that their physical integrity is essential for further breeding. For sorting such living fish in aquacultures, techniques are therefore applied which detect the girth or length of a fish using various kinds of sensors, for example, and which sort the fish according to these geometrical body dimensions. Although it is possible with such a sorting method to sort fish gently, the inventor has discovered the quality of sorting is not sufficient for implementing complex stocking plans. Yet another object of the invention, deriving from this realisation, is to provide a device and a method for fish sorting that results in more accurate fish sorting.

This and other objects are achieved, according to the invention, by an apparatus for fish sorting of the kind initially specified, and which is developed by
- at least two discharge ports through which a fish can be removed from the fish sorting device,
- a sorter which is designed to sort the fish from the weighing compartment selectively into one of the at least two discharge ports,
- an actuator unit which is coupled mechanically to the sorter and actuates a movable sorting element of the sorter in order to sort the fish into one of the discharge ports, and
- a control unit which is in signal communication with the weighing device and the actuator unit and is designed
  - to compare a weight determined by the weighing device with at least one limit weight, and
  - to activate the actuator unit, depending on the comparison between the determined weight and the limit weight, in such a way that, when the limit weight is exceeded, the fish is sorted into a first discharge port and, when the weight falls short of the limit weight, the fish is sorted into a second discharge port different from the first.

The sorter according to the invention allows precise yet efficiently prompt sorting of living fish. This is achieved by using the weight of the fish as a basis for the sorting process. The inventor has realised that this sorting criterion has proved to be a precise basis for sorting fish as part of a breeding process. With this sorting criterion, the sorter according to the invention is able to optimise fish farming in aquacultures, in particular, such that within a relative short period, for example a tenth of the total breeding period, the hatchery fish released to a shared tank are firstly sorted by weight and distributed to two or more tanks. According to the inventive sorting device and the inventive sorting method, this distribution is carried out according to weight classes, i.e. one or more weight limits are defined, and the fish are sorted according to those weight limits. By performing the sorting which is possible with the inventive sorter and applying the sorting method according to the invention, the fish can be distributed advantageously from one tank initially used for raising the fish together, to two or more tanks. This sorting can significantly improve breeding success, in that fish which were unable to increase in weight, or only insufficiently, in the shared tank used previously, show normal or better than normal development and weight increase after sorting, with the result that, at the end of a breeding period, the hatchery fish initially placed together in the tank show weight increases that are closer on the whole. Due to their precision and efficiency, the sorter and sorting method according to the invention are also suitable, in particular, for sorting a fish population several times at predetermined intervals, for example to distribute the hatchery fish originally placed together in a single, shared tank among a plurality of breeding tanks A according to weight category, in a first sorting process, and to distribute them again, after a further breeding period, among a plurality of breeding tanks B and, if necessary, to perform one or more further sorting operations to a plurality of breeding tanks C, D at further intervals, where $a \leq b \leq c \leq d \ldots$ as a basic principle.

The weighing compartment according to the invention is designed such that a single, living fish can be protectively accommodated therein. To that end, the weighing compartment preferably has a length equal to the target length of the fully grown fish, for example of at least half a meter, and preferably has a V-shaped bottom in cross-section, in which the fish can be held transversely to the longitudinal direction by the V-shape. The weighing compartment may be bounded by other side and end walls so that the fish are reliably prevented from leaping out.

The weighing device coupled to the weighing compartment may specifically include one or more force sensors, such as weighing cells based on strain measuring techniques. These weighing cells can hold the weighing compartment with tensile or compressive force and thus sense the weight of the weighing compartment and any fish placed therein. It should be understood in this regard that single-axis or multi-axis force sensors may be used and that, as regards calculating the forces measured by these force sensors, normal calculations techniques are used that take the geometrical position of the force sensors into account. A mechanical coupling is generally understood in this regard to mean a force-transmitting connection which can be achieved, for example, by direct mechanical connection, but also, alternatively, by indirect force transmission, for example by means of hydraulic or pneumatic elements.

According to the invention, two discharge ports through which a fish can be removed from the fish sorting device are also provided. Depending on its sensed weight, a weighed fish is allocated to one of these two discharge ports, thus allowing sorting to be carried out on the basis of a single limit weight. However, it should be understood as a basic principle that the fish sorting device according to the invention may also have three or even more discharge ports. Such a design allows a fish population to be divided into two or a suitable number of groups by defining several limit weights and using the latter as limit values for the respective groups. For example, three discharge ports may be provided, with fish weighing less than a lower limit weight being ejected through the first discharge port, fish weighing more than an upper limit weight being ejected through a third discharge port and fish between the upper and lower limit weight being ejected through the second discharge port.

According to the invention, a sorter is provided which is mechanically coupled to an actuator unit and is designed to sort the fish from the weighing compartment selectively into one of the at least two discharge ports. In the simplest case, this sorter and actuator unit may consist of a guide flap which is moved in such a way by means of the actuator unit, in particular in a pivoting motion, that a fish is guided out of the weighing compartment either in the direction of the one or the other discharge port. The sorter is preferably forms the bottom of the weighing compartment, so the process of discharging a fish out of the weighing compartment and feeding it to one of the two discharge ports can be accomplished with a single actuator-activated movement of a single component of the sorter according to the invention. In other variants of the invention, a fish can also be sorted out of the weighing compartment into one of three discharge ports by such a guide member, by setting it to one of three positions. More specifically, the sorter may also have two different guide flaps which preferably form the bottom of the weighing compartment and which are controlled independently by two actuators, in order to guide a fish either to the one or to the other discharge port.

According to the invention, a control unit is provided which receives the weight of a single fish, communicated from the weighing device, and which can compare that weight with a limit weight. On the basis of that comparison, the control unit can then control the actuator unit accordingly in order to allocate the fish to one of the two or more discharge ports according to its weight. The inventive fish sorter thus allows an entire stock of fish to be sorted efficiently and at the same time gently into two or more groups according to the individual weights of the fish in said stock.

According to a first preferred embodiment, the control unit is configured to compare the weight of each fish in a first quantity of fish with a first limit weight, to calculate a second limit weight based on the measured weight of said first quantity of fish, and to compare the weight of each fish in a subsequent second quantity of fish with said second limit weight.

According to this embodiment, a fish population, that is to say a plural quantity of fish to be sorted, is sorted in such a way that the limit weight applied for that purpose for a first amount of fish is different from the limit weight for a second amount of fish. It should be understood, as a basic principle, that this way of sorting can also be applied to sorting processes in which the fish are classified into more than two groups and in which two or more limit weights are used as a benchmark for delineate the groups from each other. In these variants of the invention, two or more first limit weights would be applied accordingly to a first quantity of fish and two or more second limit weights to a second quantity of fish. This development of the invention allows the fish in a fish population to be sorted in a manner which is particularly precise and beneficial for fish breeding. A more precise way of sorting can be implemented thereby, in which conclusions are drawn, on the basis of the measurement results for a predetermined quantity of fish in the fish population, about the individual weights, their distribution or average value or the like within the fish population, with a limit weight then being calculated from the characteristic value or parameter thus obtained and applied to subsequent sorting of the same fish population, thus achieving a precise sorting process that takes the previous growth of the fish population into consideration. It should be understood in this regard that, in contrast to the prior art approach in which an overview of fish growth is firstly obtained by taking random samples from the fish population, with a limit weight subsequently being set on the basis of the random sampling results and sorting being carried out by applying said limit weight, the sorting process in the case of the method according to the invention and the sorter design according to the invention is started without needing such prior random samples, in that a limit weight initially deemed realistic is used as the sorting criterion. However, the sorting device will then determine a new limit weight itself on the basis of the collated measurement results and then carry out subsequent sorting processes itself on the basis of said limit weight. Although it is also possible in theory to determine the first, initial limit weight by using limit weights obtained from random sampling, this is not necessary, according to the invention, and can be replaced with other limit weights that are determined approximately. It should also be understood in this regard that calculation of a second limit weight may also be followed by calculation of a third limit, for example after sorting a quantity of fish according to the second limit weight, in order to make the sorting process more precise on the basis of further data obtained by then.

According to another preferred embodiment, the control unit has a user interface for entering data, and an electronic memory device, and is also configured to store one or more of the following fish population features in the electronic memory device: a total number of fish in the fish population; an age or an age distribution of the fish in the fish population; a dated individual weight or a dated weight distribution of the fish in the fish population; a fish growth curve describing a relationship between age or breeding intervals and the individual weights or weight distributions of the fish in the fish population; the type of fish population, and breeding parameters of the fish population, in particular feed amount, feed intervals and feed type, water temperature and stocking density, to calculate a forecast individual weight or a forecast weight distribution of the fish in the fish population from these fish population features, and to calculate a limit weight from said individual weight or weight distribution of the fish population.

This development of the invention allows one or more limit weights for subdividing the population to be determined in a relatively reliable manner by entering or applying population characteristics based on known, stored data which can be obtained from experience with previous breeding processes, in particular. It should also be realised in this regard that it is possible on the basis of such data not only to calculate an average weight and thus a subdivision of the fish population into two halves, but also to calculate distribution rules that are of greater use for breeding purposes, for example distribution rules relating to the total weight of fish to be sorted into a tank.

It is further preferred that the control unit the control unit has a user interface or a memory unit and that the control unit is configured to receive from the user interface, or to fetch from the memory unit, fish distribution data describing a specifically defined distribution of a fish population into two or more groups, to determine an initial limit weight based on these fish distribution data, to perform one or more weighing operations on different fish and to compare the weighed fish with the initial limit weight as the limit weight and to feed the fish accordingly to one of the discharge ports, to determine, after performing the one or more weighing operations, and from the weights determined therein, a first population characteristic characterising the fish population, to calculate a corrected limit weight from said population characteristic, to perform subsequent weighing and sorting operations on the other fish in the fish population and to compare the fish weighed thereby with the corrected limit weight thus applied as the limit weight and to feed the fish accordingly to one of the discharge ports, wherein the control device has a processor which is configured to determine the corrected limit weight on the basis of the population characteristic, in order to obtain from subsequent weighing and sorting operations a defined distribution of the entire fish population specified for the fish distribution data.

This development of the invention provides a particularly advantageous configuration of the control unit that is designed for efficient and precise sorting of a fish population into two or more groups. The basis for this development of the invention is provided by fish distribution data that may be entered optionally via a user interface, or that are already stored in a memory unit in the control unit. These fish distribution data describe a manner in which the fish are to be sorted by the sorting device of the invention. For example, fish distribution data may be provided in this regard, specifying that the fish be sorted on the basis of a limit weight in such a way that fish below the limit weight are sorted into the one group and fish above the limit weight are sorted into the other group. In addition to this easily handled way of sorting, however, it is also possible, on the basis of the fish distribution data, to specify advantageous sorting rules for further breeding. For example, fish distribution data may be provided which specify that the fish are to be subdivided into two groups of equally large number, such subdivision being carried out in such a way that the one group contains the smaller fish by weight and the other group contains the larger fish by weight. The fish distribution data may also specify that the fish population be subdivided into two groups with the same total weight of fish, the one group containing the smaller fish by weight and the other group containing the larger fish by weight. It is obvious that the latter two sorting methods may result in sorting that is advantageous for further breeding, but this cannot be achieved with a limit weight that is fixed from the outset. Instead, it is necessary to determine the limit weight with reference to the individual weights of the fish within the fish population and that the distribution of these individual weights be determined. To achieve this objective, the fish sorting device in this developed form initially performs one and preferably several weighing operations on different single fish. These fish are sorted according to an initial limit weight, with any incorrect sorting of this first fish to be weighed, due to the limit weight not being finally selected, being accepted thereby, or with the fish being place in intermediate storage in an interim tank for subsequent sorting. This initial limit weight is advantageously determined, on the basis of statistical data and knowledge gained from breeding experience, in such a way that a good approximation to the fish distribution specified by the fish distribution data is also achieved by this sorting process. One or more population characteristics are then determined from the first weighing operations conducted in this manner. Examples of such population characteristics include an average weight of the weighed animals, a standard deviation of the individual weights of the weighed animals and other statistical data such as the median, maximum or minimum value, or suchlike. A corrected limit weight is then calculated from said population characteristic by the control unit according to the invention. This corrected limit weight takes into account the changes in growth and the distribution of growth within the fish population to be sorted, as ascertained from the population characteristics, and extrapolates these to the entire fish population. The corrected limit weight is then used for further sorting operations in order to divide the fish into the desired groups. The corrected limit weight is calculated in such a way that, by applying this limit weight to the entire fish population, under the assumption that the individual weights already identified permit representative statistical statements to be made about the distribution of individual weights among the entire fish population, said fish are then allocated to the plurality of groups in accordance with the fish distribution data.

This development of the invention should basically be understood in such a way that, instead of one initial and corrected weight, it is also possible to specify several initial or corrected weights in order to allocate the fish in this way to more than two groups. It should likewise be understood that the fish distribution data may also contain respective details specifying the fish distribution among several groups, for example the rule that the fish in a fish population are to be divided into three incremental groups in respect of the individual weights of the fish therein, and that the total weight of all the fish in each group is to be identical.

It is still further preferred that the fish sorting device according to the invention be developed such that the control unit has a user interface or an electronic memory unit, and that the control unit is configured unit to receive the fish distribution data which are entered in the user interface or stored in the electronic memory unit and which include one or more of the following distribution rules:
  a ratio, determined according to the quantity of fish, for classifying the fish population into two or more groups having different weight classes,
  a ratio, determined according to the total weight of fish in a group, for classifying the fish population into two or more groups having different weight classes,
  a maximum difference in weight between the lightest and the heaviest fish in a group of fish,
and to calculate from said fish distribution data one or more limit weights according to which the fish population is to be classified, and, where relevant, a number of groups into which the fish population is to be classified.

With this development of the invention, fish distribution data that are particularly advantageous for further breeding are defined, and the control unit for processing and for producing the relevant targets for the limit weights in such fish distribution data is further developed.

It is also preferred that the control unit is in signal communication with the weighing device in order to receive individual weights of the fish weighed therein and is configured to calculate from the individual weights of one or more fish received in this manner a population characteristic which includes one or more of the following characteristics:

an average individual weight of the weighed fish,
statistical distribution characteristics of the single weights of the weighed fish, in particular the standard deviation, quantiles and median, quartile, percentiles, maximum weight and/or minimum weight,
a distribution curve for the individual fish weights among the quantity of fish,
a quantity of weighed fish,
and to calculate from said fish distribution data one or more limit weights according to which the fish population is to be classified, and, where relevant, a number of groups into which the fish population is to be classified.

With this development of the invention, the control unit is further developed such that, on the basis of the knowledge gained from the first measurements about the individual weights of the fish within the fish population, it can either suggest or directly perform a sorting operation that is advantageous for further breeding, either by determining one or more limit weights or even, where relevant, suggesting the number of groups it would be advantageous to create, or taking that number into consideration during sorting. For example, a fish population in which the individual weights of the fish are distributed over a small range only is to be divided for further breeding into just a few groups, for example two, in order to achieve advantageous breeding conditions for each fish in the fish population. Fish populations in which the individual weights of the fish are spread over a greater range ("broad distribution curve") are advantageously divided into several groups, for example three, in order to obtain optimal breeding conditions for each fish in the population. The limit weights must be chosen accordingly so that fish with the same or only slightly different individual weights are sorted into one group.

It is still further preferred that the weighing compartment is mechanically coupled via one or more weighing cells, in particular via four weighing cells, to a holding frame arranged above the weighing compartment. The arrangement with four weighing cells allows the weighing compartment to be suspended from four attachment points arranged in a rectangle and therefore allows the weighing cells, which typically measure with electrical means, to be arranged with regard to dripping water in a way that is not dangerous for the fish, while also allowing the weighing compartment to be ergonomically designed so that it can be easily accessed when sending in the individual fish. The suspended arrangement of the weighing compartment also prevents the weighing cells from being damaged and impaired in their function by water dripping out of the weighing compartment.

It is still further preferred that the weighing compartment has a V-shaped bottom in cross-section, which has a first pivotably mounted bottom flap actuated by means of a first actuator and a second pivotably mounted bottom flap actuated by means of a second actuator,
the V-shaped bottom lying in the direction of gravity above the first and second discharge port,
a through opening between the weighing compartment and the first discharge port, through which a fish moves under the influence of gravity out of the weighing compartment to the first discharge port, being opened by pivoting the first bottom flap, and
a through opening between the weighing compartment and the second discharge port, through which a fish moves under the influence of gravity out of the weighing compartment to the second discharge port, being opened by pivoting the second bottom flap.

This variant provides an advantageous design of the weighing compartment for gently receiving the fish, in which the fish come to lie safely in the V-shaped bottom with no risk of injury even in the event of the fish moving or leaping in the weighing compartment. Due to the selective pivoting of the first or the second bottom flap, the fish can be selectively conveyed both gently and under the force of gravity out of the weighing compartment and into the first or the second discharge port, accordingly, without any significant heights or the like having to be surmounted. Each of the bottom flaps are preferably used instead as slides for the fish.

It is still further preferred in this regard that a through opening between the weighing compartment and a third discharge port, through which a fish moves under the influence of gravity out of the weighing compartment to the third discharge port, is opened by pivoting the first and second bottom flap. This variant of the invention allows the fish to the weighed and sorted into three groups in a robust yet species-appropriate manner, with allocation to a total of three discharge ports being effected by means of just two guide members in the form of the bottom flaps, each of which can be individually actuated by two respective actuators.

It should be understood in this regard that additional fixed or movable guide devices may be provided to ensure that the fish reach the intended discharge port, even if they move during the sorting operation and do not follow a gravitational line as a result.

It should be understood, as a basic principle, that a ejection compartment in which the animals firstly come to lie and from which they then exit the sorting device through the discharge port, can be provided in addition between weighing compartment and discharge port.

It is specifically preferred, accordingly, that the weighing compartment is so designed, in order to receive a fish with its longitudinal body axis in a horizontal position, that each through opening leading out of the weighing compartment is arranged and designed in such a way that a fish glides perpendicularly to its longitudinal body axis out of the weighing compartment into a first, second or third discharge compartment assigned to the first, second or third discharge port, respectively, and that the fish glides in the direction of its longitudinal body axis out of the first, second or third discharge compartment through the first, second and/or third discharge port. With this variant of the fish sorting device according to the invention, the fish can be weighed and sorted in the fish sorting device in a way that is safe and gentle for the fish.

It is still further preferred, finally, that the fish sorting device be further developed by designing the weighing compartment to determine by means of electrical energy the weight of a fish placed therein and to transmit said weight to a control device operated with electrical energy, and that the actuator unit is operated by means of pneumatic energy for actuating the sorter, and that the fish sorting device is further characterised by an electrical energy accumulator for supplying power to the weighing compartment and the control unit, and by a pneumatic energy accumulator for actuating the actuator unit.

This development of the invention provides a configuration of the fish sorting device according to the invention that poses no risk to the fish as far as the energies and amounts of energy involved are concerned. Providing suitable electrical and pneumatic accumulators also allows the fish sorting device according to the invention to be operated as a mobile unit independently of any external energy supply. This embodiment is advantageous, in particular, for use in very large aquaculture systems, in order to keep the transport paths to and from the fish sorting device as small as possible.

Another aspect of the invention relates to a fish sorting method comprising the following steps:
- isolating the individual fish of a fish population comprising a plurality of fish,
- placing a single fish into a weighing compartment,
- measuring the weight of the single fish by means of at least one weighing cell mechanically coupled to the weighing compartment,
- comparing the measured weight with at least one limit weight,
- discharging the fish from the weighing compartment to a first discharge port if the measured weight exceeds the limit weight, and
- discharging the fish from the weighing compartment to a second discharge port if the measured weight falls short of the limit weight.

The fish sorting method according to the invention allows a particularly advantageous kind of fish sorting that provides a basis for optimised fish breeding. The fish sorting method according to the invention can be used several times to that end in the course of breeding a fish population, in order to allocate the fish in the fish population to a plurality of groups in which the individual weights of the fish are in a similar range.

The fish sorting method according to the invention can be further developed according to claims 13-17. With regard to the specific variants, terminology and advantages involved here, reference is made to the description in the foregoing of the fish sorting device developed to carry out the respective method.

Figure 2:
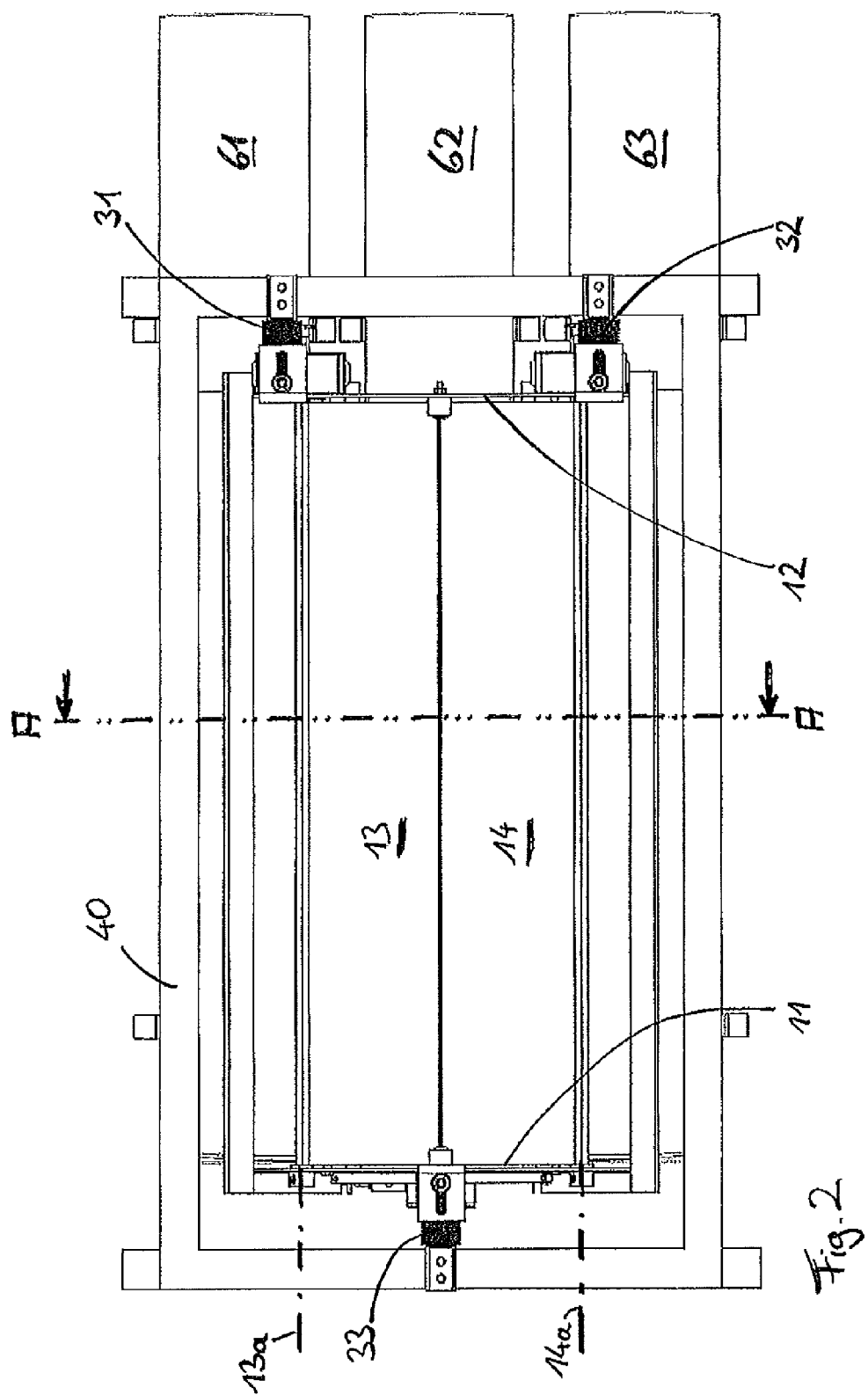
Figure 3:
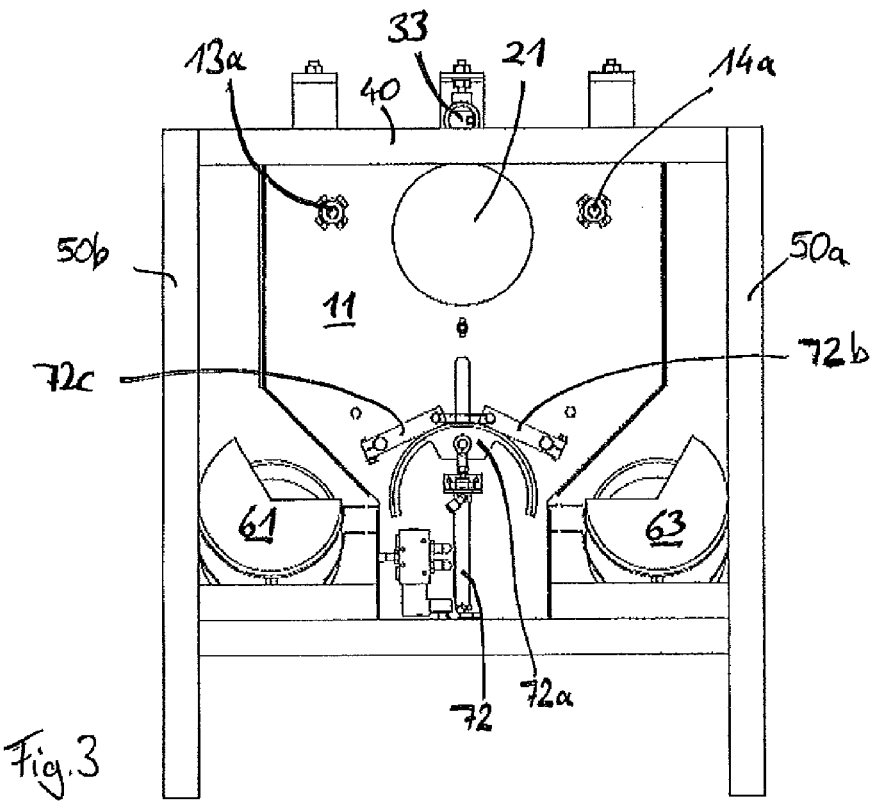
Figure 4:
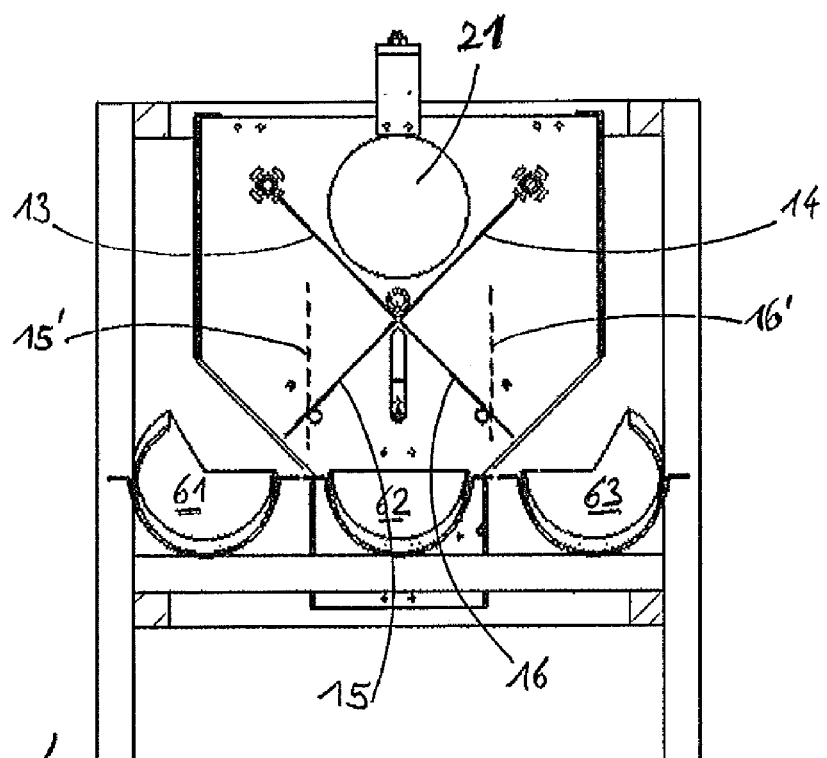

A preferred embodiment of the fish sorting device according to the invention shall now be described with reference to the Figures, in which:

FIG. 1: shows a perspective view at an angle from above, behind and to the side, FIG. 2 shows a plan view of the embodiment according to FIG. 1, FIG. 3: shows a frontal side view of the embodiment according to FIG. 1, FIG. 4 shows a cutaway front view of the embodiment according to FIG. 1, along A-A in FIG. 2, and FIG. 5: shows a side view of the embodiment according to FIG. 1.

FIGS. 1 to 5 show a fish sorting device which is designed to classify fish into a total of three categories. The fish sorting device comprises a weighing compartment 10, which is formed by a front end wall 11, a rear end wall 12 and pivotable bottom flaps 13, 14.

A circular hole 21 through which individual fish can be fed in a substantially horizontal direction of movement into the weighing compartment from outside is formed in front end wall 11. A similar circular hole 22, which can likewise be used to supply individual fish, is formed in rear end wall 12.

The two bottom flaps 13, 14 are arranged slantingly relative to the horizontal and thus extend, in a cross-section of the weighing compartment, from the upper outer side in a slanting inwards direction to the bottom. The two bottom flaps are each mounted pivotably at the upper outer end about an axis 13a, 14a running along the respective upper outer edge. The two bottom flaps 13, 14 are closely adjacent to each other at their bottom inner longitudinal edge 13b, 14b and thus form in cross-section a V-shaped bottom surface of the weighing compartment.

Rear end wall 12 is suspendingly attached to a rectangular upper frame spaced apart by means of two weighing cells 31, 32 which are disposed spaced apart from each other on the upper edge of said rear end wall. Front end wall 11 at the opposite end is likewise suspendingly attached to said frame 40 by means of a single weighing cell 33 disposed in the middle above hole 21. Bottom flaps 13, 14 are pivotably mounted in the front and rear end walls 11, 12 and are therefore attached solely to said end walls. The windowed side walls which laterally shield the weighing compartment and the bottom flaps 13, 14 are attached to the front and rear end walls 11, 12. The weighing compartment is not connected to the frame of the receiving device at any point other than from weighing cells 31-33 and is therefore mounted freely suspendingly. The weight of a fish lying on the bottom flaps 13, 14 in the weighing compartment can thus be measured reliably by means of weighing cells 31-33.

Horizontal frame 40 is supported by four perpendicular supporting legs 50a-d extending to the ground contact area. Another horizontally extending rectangular frame 60 is attached to the lower region of said vertical supporting legs 50a-d. Said frame 60 supports a total of three tubes, the diameters of which are so dimensioned that a fish can glide through said tubes. Tubes 61-63 are slightly inclined relative to the horizontal in such a way that they incline downwards from front side 11 to rear side 12, as a result of which a fish can glide in this downwardly inclined direction through tubes 61-63.

Tubes 61-63 lie below the weighing compartment in the direction of gravity. Middle tube 62 is upwardly open over about 180° of its circumference in the region below the weighing compartment, so that a fish can fall out of the weighing compartment into the tube in the radial direction. The two lateral tubes 61, 63 are likewise cut open at the top, in the region below the weighing compartment, over about 110° of their circumference, with the hole facing the weighing compartment.

Bottom flap 13 can be pivoted by a pneumatic rotary actuator 73 disposed on the outside of rear end wall 12 out of the position shown, about axis 13a, in such a way that its bottom edges 13b are moved in the outwards direction. This causes a fish lying on bottom flap 13, 14 to glide out of the weighing compartment and radially from above into outer tube 61. Owing to the slight inclination of tube 61, said fish then glides through the tube and exits via discharge port 61a, in order to be conveyed from there to a first tank under the force of gravity, where relevant, or by means of a conveying device.

Bottom flap 14 can be pivoted in the same manner by means of a pneumatic rotary actuator 74, to cause the fish to glide slantingly outwards into outer tube 63 and the fish to exit via discharge port 63a.

A pneumatic linear actuator 72 which acts via an arcuate guide 72a like a motion link on two levers 72b, c and pivots the latter is disposed on the front end wall. Levers 72b, c act in turn on two pivotable guide flaps 15, 16 below bottom flaps 13, 14. The latter guide flaps serve to laterally define a chute for the fish. After pivoting the guide flaps into a perpendicular position shown by broken lines 15', 16' in FIG. 4, bottom flaps 13, 14 open simultaneously. This causes the weighing compartment to open downward in such a way that a fish therein enters tube 52 radially downwards, from whence it then exits the sorting device via discharge port 62a.

Weighing cells 31-33 and pneumatic actuators 72-74 are in signal communication with a control device (not shown). Said control device is designed to analyse the signals from the weighing cells 31-33 in such a way that the weight of a fish is determined. On the basis of the fish weight determined in this manner, the control device decides, by comparing said weight with two limit weights, whether said fish must be sorted into a first, a second or a third group and activates actuators 72-74 accordingly so that the fish is guided out of the weighing compartment to either the first tube 61, the second tube 62 or the third tube 63.

The control device proceeds thereby as follows:

Once the user has entered, via user interface, the time at which the hatchery fish were put out, the type of hatchery fish and other characteristics such as the water temperature in the breeding tank and the amounts and types of feed, the breeding duration since the hatchery fish were placed in the breeding tank until the sorting time is calculated using said data. On the basis of that duration, an estimation is made of the average individual weight of all the fish in the breeding tank, and a distribution of those individual weights over the entire fish population is calculated on the basis of experience.

On the basis of that calculation, the control device then recommends a particular sorting procedure to the user via a user interface for outputting data, in this case a touch-sensitive screen, and provides a recommendation regarding a number of groups into which the fish population should be divided, and how that should be carried out. This manner of dividing the population is typically expressed as a number of fish per group, or as the total weight of all the fish in a group. The data thus outputted as a recommendation are calculated by the control device from previously stored values and curves, obtained from experience, regarding the optimal course of breeding for the respective fish species.

The user has the option of following that recommendation or of modifying it on the basis of his own experience, the options provided by his fish farm, or suchlike. The user can thus specify the number of groups to be sorted into, and the definition of those groups, via a user interface for entering data. The sorting process is preferably chosen with the fish sorting device shown here in such a way that the fish are sorted into a maximum of three groups. However, it should be understood as a basic principle that the sorting device according to the invention can also be developed to sort fish into more than three groups, by variably pivoting the bottom flaps accordingly so that a fish in the weighing compartment is fed into one of four, five or more tubes. Alternatively, it is possible with the fish sorting device shown here as one embodiment to sort the fish into more than three groups by performing multiple sorting operations. For example, it sorting into a total of five groups is desired, then two groups can firstly be sorted into tubes 61 and 63, and the other three groups into the middle tube 62, after which the fish fed out of tube 62 into an intermediate storage tank are subsequently sorted into three separate groups.

Once the fish sorting device has weighed a total of 30 fish in this way, a statistical description of the weight distribution within the fish population to be sorted is produced on the basis of the 30 individual weights thus determined. A mean value, a 30% percentile and a 70% percentile are taken as characteristics, and the distribution of the individual weights of the fish within the total population is estimated on that basis. On the basis of that weight distribution, the two limit weights used to distribute the first thirty fish on the basis of experiential knowledge are correctly accordingly in order to obtain the desired distribution when continuing to sort all the fish in the fish population. The basic procedure is that a fish which falls short of a lower limit weight is guided into the first tube 61, a fish which exceeds an upper limit weight is guided into the third tube 63, and a fish which reaches or falls short of the upper limit weight and reaches or exceeds the lower weight is guided into the middle tube 62.

It has been found that an estimation of weight distribution based on about 30 fish is generally sufficient for reliably estimating the overall weight distribution of all the fish in a population of approximately 1000 fish to be sorted. However, in certain specific cases, and depending on the breeding conditions and the particular species of fish, it may make sense to include a larger amount of fish in the initial measurements, and in other cases, after a first correction of the limit weights after a quantity of n sorted fish, to make a second correction of the limit weights after m fish have been sorted, where m is greater than n.

The invention claimed is:

1. A fish sorting device, comprising:
a weighing compartment adapted to receive a single fish;
a weighing device mechanically coupled to the weighing compartment, the weighing device adapted to sense the weight exerted on the weighing compartment by the fish;
at least two discharge ports through which a fish can be removed from the fish sorting device;
a fish sorter to sort the fish from the weighing compartment selectively into one of the at least two discharge ports;
an actuator unit coupled mechanically to the fish sorter for actuating a movable sorting element of the fish sorter in order to sort the fish into one of the discharge ports; and
a control unit in signal communication with the weighing device and the actuator unit, wherein the control unit compares the weight of the fish determined by the weighing device with at least one limit weight, and activates the actuator unit depending on the comparison between the determined weight and the limit weight, such that when the limit weight is exceeded, the fish is sorted into a first discharge port and, when the weight falls short of the limit weight, the fish is sorted into a second discharge port different from the first;
wherein the weighing compartment has a V-shaped bottom in vertical cross section, the weighing compartment further having a first pivotably mounted bottom flap actuated by means of a first actuator and a second pivotably mounted bottom flap actuated by means of a second discharge port, the fish sorter further comprising a through opening between the weighing compartment and the first discharge port through which a fish moves under the influence of gravity out of the weighing compartment to the first discharge port that is opened by pivoting the first bottom flap, and a through opening between the weighing compartment and the second discharge port through which a fish moves under the influence of gravity out of the weighing compartment to the second discharge port that is opened by pivoting the second bottom flap.

2. The fish sorting device according to claim 1, wherein the control unit is configured to compare the weight of each fish in a first quantity of fish with a first limit weight, to calculate a second limit weight based on the measured weight of said first quantity of fish, and to compare the weight of each fish in a subsequent second quantity of fish with said second limit weight.

3. The fish sorting device according to claim 1, wherein the control unit has a user interface for entering data and an electronic memory device, the control unit further adapted to store one or more features of a fish population in the electronic memory device, the features including the total number of fish in the fish population, an age or an age distribution of the fish in the fish population, a dated individual weight or a dated weight distribution of the fish in the fish population, a fish growth curve describing a relationship between age or breeding intervals and the individual weights or weight distributions of the fish in the fish population, the type of fish population, and breeding parameters of the fish population, in particular feed amount, feed intervals and feed type, water temperature and stocking density, wherein the control unit calculates a forecast individual weight or a forecast weight distribution of the fish in the fish population from these fish population features, and calculates a limit weight from the individual weight or weight distribution of the fish population.

4. The fish sorting device according claim 1, wherein the control unit has a user interface or a memory unit and the control unit is configured to receive from the user interface, or to fetch from the memory unit, fish distribution data describing a specifically defined distribution of a fish population into two or more groups, to determine an initial limit weight based on these fish distribution data, to perform one or more weighing operations on different fish and to compare the weighed fish with the initial limit weight as the limit weight and to feed the fish according to one of the discharge ports, to determine, after performing the one or more weighing operations, and from the weights determined therein, a first population characteristic characterizing the fish population, to calculate a corrected limit weight from said population characteristic, to perform subsequent weighing and sorting operations on the other fish in the fish population and to compare the fish weighed thereby with the corrected limit weight thus applied as the limit weight and to feed the fish according to one of the discharge ports, wherein the control device has a processor configured to determine the corrected limit weight on the basis of the population characteristic, in order to obtain from subsequent weighing and sorting operations a defined distribution of the entire fish population specified for the fish distribution data.

5. The fish sorting device according to claim 1, wherein the control unit has a user interface or an electronic memory unit and the control unit is configured to receive a fish distribution data which are entered in the user interface or stored in the electronic memory unit and which include at least one distribution rule wherein the distribution rule is a ratio, which is determined according to the quantity of fish, for classifying the fish population into two or more groups having different weight classes, and wherein a ratio is determined according to the total weight of fish in a group, for classifying the fish population into two or more groups having different weight classes, or a maximum difference in weight between the lightest and the heaviest fish in a group of fish, whereby the control unit calculates from the fish distribution data one or more limit weights according to which the fish population is to be classified, and, where relevant, a number of groups into which the fish population is to be classified.

6. The fish sorting device according to claim 1, wherein the control unit is in signal communication with the weighing device in order to receive individual weights of the fish weighed therein and is configured to calculate from the received individual weights of one or more fish, a population characteristic which includes at least one of the characteristics of an average individual weight of the weighed fish, a statistical distribution of the single weights of the weighed fish, in particular the standard deviation, quantiles and median, quartile, percentiles, maximum weight and/or minimum weight, a distribution curve for the individual fish weights among the quantity of fish, or a quantity of weighed fish, whereby the control unit calculates from the fish characteristics one or more limit weights according to which the fish population is to be classified, and, where relevant, a number of groups into which the fish population is to be classified.

7. The fish sorting device according to claim 1, wherein the weighing compartment is mechanically coupled via a plurality of weighing cells to a holding frame arranged above the weighing compartment.

8. The fish sorting device according to claim 1, further comprising a through opening between the weighing compartment, opening flaps and a third discharge port through which a fish moves under the influence of gravity out of the weighing compartment to the third discharge port that is opened by opening flaps and pivoting the first and second bottom flap.

9. The fish sorting device according to claim 8, wherein the weighing compartment is adapted to receive a fish with its longitudinal body axis in a horizontal position, that each through opening from the weighing compartment is adapted in such a way that a fish may glide perpendicularly to its longitudinal body axis out of the weighing compartment into a first, second or third discharge compartment assigned to the first, second or third discharge port, respectively, and that the fish may glide in the direction of its longitudinal body axis out of the first, second or third discharge compartment through the first, second and/or third discharge port.

10. The fish sorting device according to claim 1, wherein the weighing compartment is adapted to determine by means of electrical energy the weight of a fish placed therein and to transmit the weight to a control device operated with electrical energy and the actuator unit is operated by means of pneumatic energy for actuating the fish sorter, the fish sorting device further comprising an electrical energy accumulator for supplying power to the weighing compartment and the control unit and a pneumatic energy accumulator for actuating the actuator unit.

11. A fish sorting method comprising the steps of:
isolating the individual fish of a fish population comprising a plurality of fish;
placing a single fish into a weighing compartment;
measuring the weight of the single fish by means of at least one weighing cell mechanically coupled to the weighing compartment;
comparing the measured weight with at least one limit weight;
discharging the fish from the weighing compartment to a first discharge port if the measured weight exceeds the limit weight; and
discharging the fish from the weighing compartment to a second discharge port if the measured weight falls short of the limit weight;
wherein the fish is positioned in the weighing compartment on a V-shaped bottom comprising a first pivotably mounted bottom flap actuated by means of a first activator and a second pivotably mounted bottom flap actuated by means of a second actuator and wherein the fish is either directed to the first discharge port by actuating the first pivotably mounted bottom flap using the first actuator or the fish is directed to the second discharge port by actuating the second pivotably mounted bottom flap using the second actuator, respectively and the fish falls through either of the first or second discharge port under the influence of gravity.

12. The fish sorting method according to claim 11, wherein the individual weights of a first quantity of fish are measured in a first measuring sequence, compared with a first limit weight, and the fish ejected accordingly to the first or second discharge port, a second limit weight is calculated on the basis of the measured weights from the first measuring sequence, and the individual weights of a second quantity of quantity of fish are measured in a subsequent second measuring sequence, the weight of each fish in the second measuring sequence being compared with the second limit weight, and the fish ejected accordingly through the first or second discharge port.

13. The fish sorting method according to claim 11, wherein one or more of the following features of the fish population is entered via a user interface or fetched from a stored table:
- the total number of fish in the fish population;
- an age or an age distribution of the fish in the fish population;
- a dated individual weight or a dated weight distribution of the fish in the fish population;
- a fish growth curve describing a relationship between age or breeding intervals and the individual weights or weight distributions of the fish in the fish population;
- the type of fish population; and
- breeding parameters of the fish population, in particular feed amount, feed intervals and feed type, water temperature and stocking density;
- whereby a forecast individual weight or a forecast weight distribution of the fish in the fish population is calculated from said fish population features and a limit weight is calculated according to the single weight or the weight distribution of the fish population.

14. The fish sorting method according to claim 11, wherein a fish distribution data describing a specifically defined distribution of a fish population into two or more groups is entered via a user interface or fetched from a memory device;
- an initial limit weight is calculated according to said fish distribution data;
- the individual weight of one or more fish is measured in a first measuring sequence, compared with the initial limit weight as the limit weight, and the fish is fed according to one of the discharge ports;
- a first population characteristic characterizing the fish population is determined after performing the one or more weighing operations, and from the weights determined therein;
- a corrected limit weight is calculated from the population characteristic;
- the individual weight of one or more fish is measured in a second measuring sequence, compared with the corrected limit weight applied as the limit weight, and the fish is fed according to one of the discharge ports; and
- the corrected limit weight is determined on the basis of the population characteristic in such a way that a distribution rule specified for the fish distribution data is obtained for distributing the entire fish population to the first and second discharge port.

15. The fish sorting method according to claim 11, wherein one or more of the following fish distribution data is entered via a user interface or fetched from a stored table:
- a ratio, determined according to the quantity of fish, for classifying the fish population into two or more groups having different weight classes;
- a ratio, determined according to the total weight of fish in a group, for classifying the fish population into two or more groups having different weight classes; or
- a maximum weight spread in a group of fish;
- whereby one or more limit weights according to which the fish population is to be classified, and, if relevant, a number of groups, into which the fish population is to be classified, are calculated from these fish distribution data.

16. The fish sorting method according to claim 11, wherein fish distribution data derived from one or more of the following characteristics is calculated from the individual weights of the weighed fish:
- an average individual weight of the weighed fish;
- a statistical distribution characteristic of the single weights of the weighed fish, in particular the standard deviation, median, 80% quartile, maximum weight and/or minimum weight, and
- a quantity of weighed fish;
- whereby one or more limit weights according to which the fish population is to be classified, and, if relevant, a number of groups, into which the fish population is to be classified, are calculated from these fish distribution data.

* * * * *

UNITED STATES PATENT AND TRADEMARK OFFICE
CERTIFICATE OF CORRECTION

| | | |
|---|---|---|
| PATENT NO. | : 9,210,915 B2 | Page 1 of 1 |
| APPLICATION NO. | : 13/822859 | |
| DATED | : December 15, 2015 | |
| INVENTOR(S) | : Kunnen | |

It is certified that error appears in the above-identified patent and that said Letters Patent is hereby corrected as shown below:

In the claims

Col. 12, claim 1, line 36:

after "second" insert --actuator, the V-shaped bottom disposed in the direction of gravity above the first and second--.

Signed and Sealed this
Twenty-ninth Day of March, 2016

Michelle K. Lee
*Director of the United States Patent and Trademark Office*